United States Patent [19]

Kawai

[11] Patent Number: 5,719,458
[45] Date of Patent: Feb. 17, 1998

[54] POWER GENERATOR WITH IMPROVED ROTOR

[75] Inventor: Teruo Kawai, Tokyo, Japan

[73] Assignee: Nihon Riken Co., Ltd., Tokyo, Japan

[21] Appl. No.: 569,208

[22] PCT Filed: Jun. 16, 1994

[86] PCT No.: PCT/JP94/00970

§ 371 Date: Jul. 5, 1996

§ 102(e) Date: Jul. 5, 1996

[87] PCT Pub. No.: WO95/00995

PCT Pub. Date: Jan. 5, 1995

[30] Foreign Application Priority Data

Jun. 17, 1993 [JP] Japan ................... 5-146532
Oct. 7, 1993 [JP] Japan ................... 5-251910

[51] Int. Cl.$^6$ ................... H02K 37/00; H21K 8/00
[52] U.S. Cl. ................... 310/156; 310/80; 310/81; 310/82; 310/261
[58] Field of Search ................... 310/156, 261, 310/80, 81, 82; 148/108

[56] References Cited

U.S. PATENT DOCUMENTS

| | | | |
|---|---|---|---|
| 3,676,764 | 7/1972 | Syverson | 322/51 |
| 3,849,213 | 11/1974 | Baermann | 148/108 |
| 3,898,599 | 8/1975 | Reid et al. | 335/302 |
| 4,404,484 | 9/1983 | Gillott | 310/49 R |
| 4,565,938 | 1/1986 | Fawzy | 310/156 |
| 4,749,933 | 6/1988 | Ben-Aaron | 318/810 |
| 5,030,866 | 7/1991 | Kawai | 310/82 |
| 5,292,284 | 3/1994 | Denk et al. | 464/29 |

Primary Examiner—Clayton E. LaBalle
Assistant Examiner—Tran N. Nguyen
Attorney, Agent, or Firm—Wenderoth, Lind & Ponack

[57] ABSTRACT

A power generator includes an electromagnet for generating a rotating magnetic field when being excited by a three-phase alternating current applied thereto, a rotation output shaft rotatably supported on a supporting member in such a manner as to be positioned in the rotating magnetic field, and permanent magnets disposed around the rotation output shaft in such a manner that the polarity thereof is reverse to that of the rotating magnetic field. The permanent magnets are rotated together with the rotation output shaft, and magnetic bodies disposed outside the permanent magnets in such a manner as to be rotated together with the rotation output shaft. A magnetic flux of the permanent magnets passes through the magnetic bodies. Magnetic tooth portions are provided around outer peripheral portions of the magnetic bodies. Each of the magnetic tooth portions has a width being nearly equal to the width of the rotating magnetic field. When the electromagnet is excited, the magnetic flux is converged on the rotating magnetic field side and is rotated together with the rotating magnetic field, whereby the rotation output shaft receives a rotating torque.

11 Claims, 13 Drawing Sheets

POWER GENERATOR WITH IMPROVED ROTOR

TECHNICAL FIELD

The present invention relates to a power converter including a stator and a rotor, wherein the stator is composed of an electromagnet for generating a rotating magnetic field by an alternating current and the rotor is composed of a permanent magnet combined with a magnetic body made of a mild steel or the like. In particular, the present invention concerns a power generator which is similar in basic structure to a synchronous motor and has an excellent energy efficiency represented by an input-output ratio of energy, is made compact, and is rotated in synchronization with a rotating magnetic field like a synchronous motor, thereby providing a rotating torque proportional to intensities of a rotating magnetic field of the electromagnet and a magnetic field of the permanent magnet.

BACKGROUND ART

A known induction motor includes a stator and a rotor, wherein the stator is composed of an electromagnet for generating a rotating magnetic field by an alternating current and the rotor is composed of a solid core or a squirrel-cage rotor, thereby generating a torque by electromagnetic induction. In this induction motor, it is relatively easy to reach an energy efficiency represented by an input-output ratio of energy of about 80%, but it is very difficult to exceed 80% because of the effect of copper losses.

A permanent magnet type synchronous motor also has been known, in which a rotor is composed of a permanent magnet. In such a synchronous motor, a rotating magnetic field generated by an alternating current applied to an electromagnet constituting a stator attracts and rotates the permanent magnet constituting the rotor, and thereby a rotating torque is proportional to intensities of a rotating magnetic field and a magnetic field of the permanent magnet. The permanent magnet type synchronous motor, however, is difficult to self-start, and accordingly it has a squirrel-cage rotor for accelerating the rotor on the basis of the principle of the induction motor. In other words, the synchronous motor of this type has a combined structure of two motors (permanent magnet motor and induction motor), leading to a problem in that the structure is enlarged in size.

SUMMARY OF THE INVENTION

An object of the present invention is to provide a power generator with a compact structure, which is excellent in energy efficiency and is capable of generating a high rotating torque.

To achieve the above object, according to a preferred mode of the present invention, there is provided a power generator for converting a magnetic energy into a motive power, comprising:

an electromagnet for generating a rotating magnetic field by an alternating current applied to a coil of the electromagnet, the electromagnet being fixed on a supporting member;

a rotation output shaft rotatably supported on the supporting member in such a manner as to be positioned in the rotating magnetic field;

a permanent magnet disposed around the rotation output shaft in such a manner that a polarity of the permanent magnet is reverse to that of the rotating magnet field, the permanent magnet being rotated together with the rotation output shaft; and a plurality of magnetic bodies disposed outside the permanent magnet in such a manner as to be rotated together with the rotation output shaft;

wherein a magnetic flux of the permanent magnet passes through the magnetic bodies, and when the electromagnet is excited, the magnetic flux is rotated together with the rotating magnetic field while being converged on a side of the rotating magnetic field, whereby the rotation output shaft receives a rotating torque.

According to the above-described power generator of the present invention, the magnetic flux, passing through the magnetic bodies, of the permanent magnet spreads over the entire magnetic bodies when no alternating current is applied to the electromagnet. However, when a rotating magnetic field is generated by an alternating current applied to the electromagnet, the magnetic flux is converged on the rotating magnetic field side, to generate an initial torque. As a result, the rotor (magnetic bodies and permanent magnet) instantly comes to a synchronous state, and is transferred to synchronous operation, that is, to operation by a rotating torque generated depending an a load angle θ between magnetic axes of the rotating magnetic field and the rotor.

The power generator of the present invention has a structure similar to that of a synchronous motor, but it is different from a permanent magnet type synchronous motor in that magnetic bodies are disposed outside a permanent magnet. The power generator of the present invention is also different in magnetic field produced by the permanent magnet from an induction type synchronous motor having a rotor in which a radially magnetized permanent magnet (single type) or an axially magnetized permanent magnet (double type) is disposed at the center and a mild magnetic body having a plurality of teeth is formed around the permanent magnet. Namely, the inductor type synchronous motor is of a mono-pole type; however, the power generator of the present invention is of a type having two or more poles. Additionally, in the inductor type synchronous motor, a plurality of teeth are provided on a mild magnetic body constituting an iron core for increasing an apparent number of poles, thereby reducing a synchronous speed so that the rotor is directly induced from the stopping state to the synchronous state without provision of a squirrel-cage rotor. Accordingly, the performance of the motor of this type is due to the number of teeth provided on the mild magnetic body. On the contrary, the power generator of the present invention is not limited in the number of teeth provided on the magnetic body.

BEST MODE FOR CARRYING OUT THE INVENTION

Hereinafter, preferred embodiments of the present invention will be described with reference to the accompanying drawings.

Figure 1:
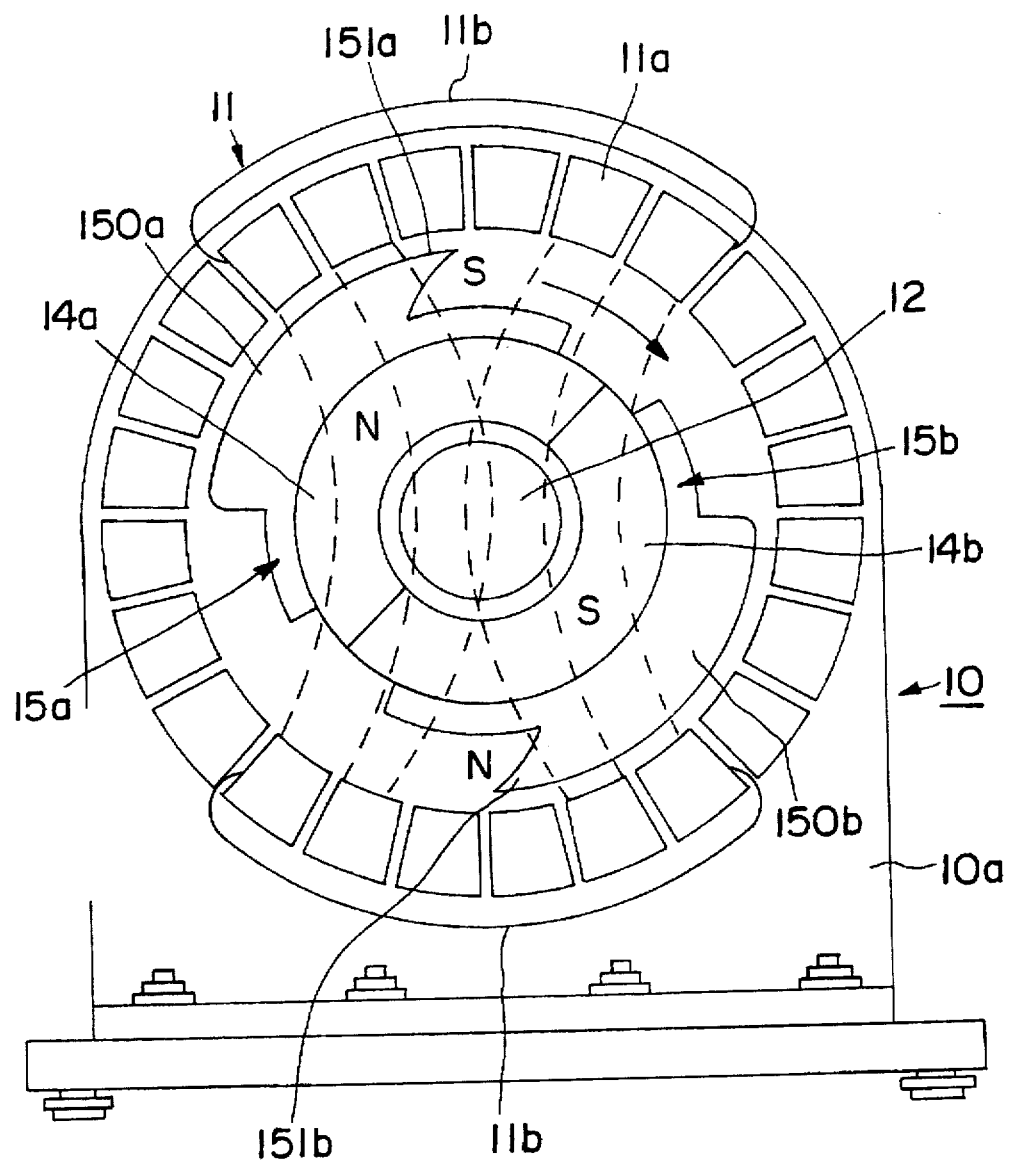
FIG. 1 is a schematic side view of a first embodiment of a motor according to the present invention, with parts partially cutaway.
Figure 2:
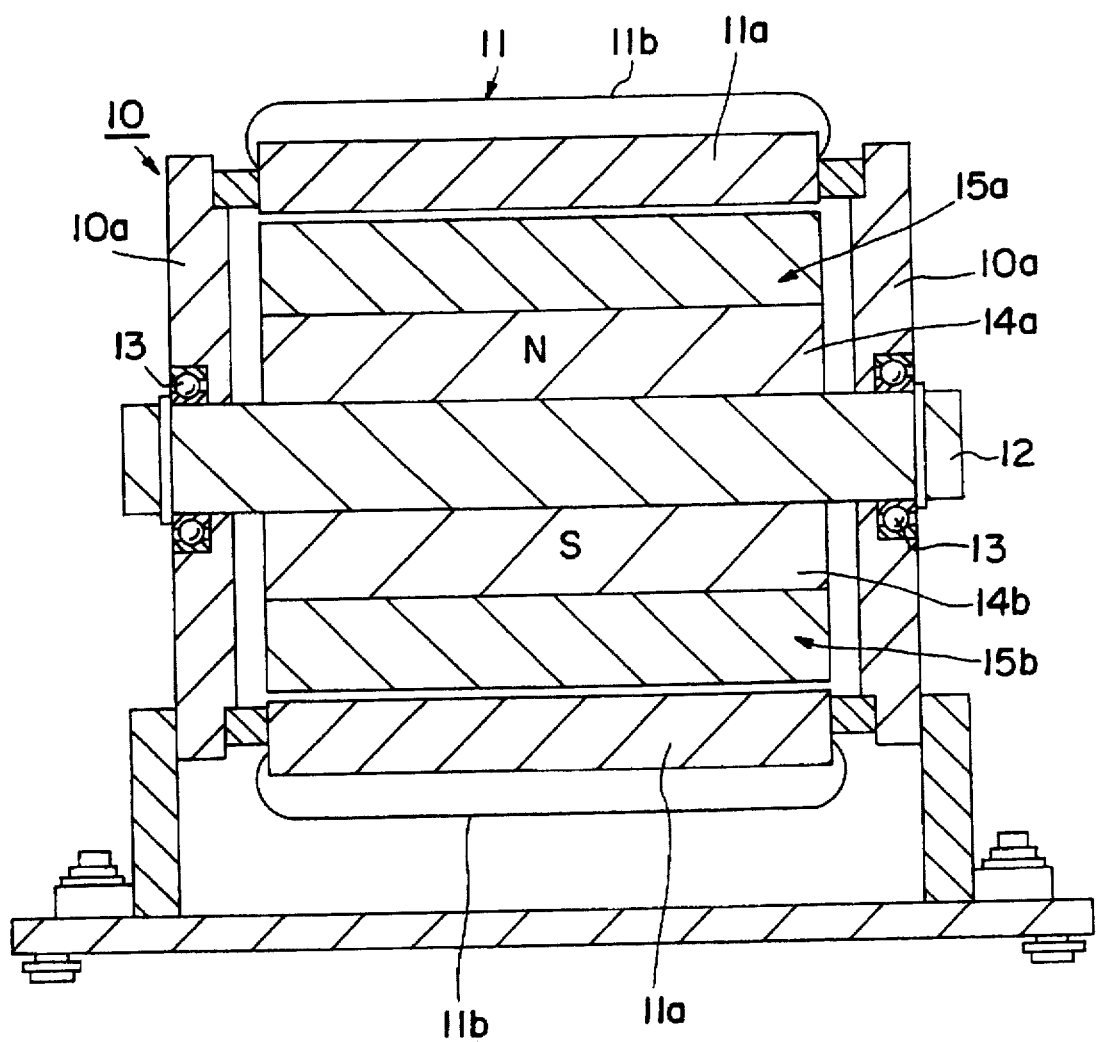
FIG. 2 is a vertical sectional view of the motor shown in FIG. 1.
Figure 3:
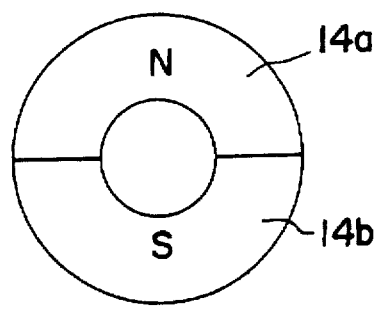
FIG. 3 is an end view of a permanent magnet of the motor shown in FIG. 1.
Figure 4:
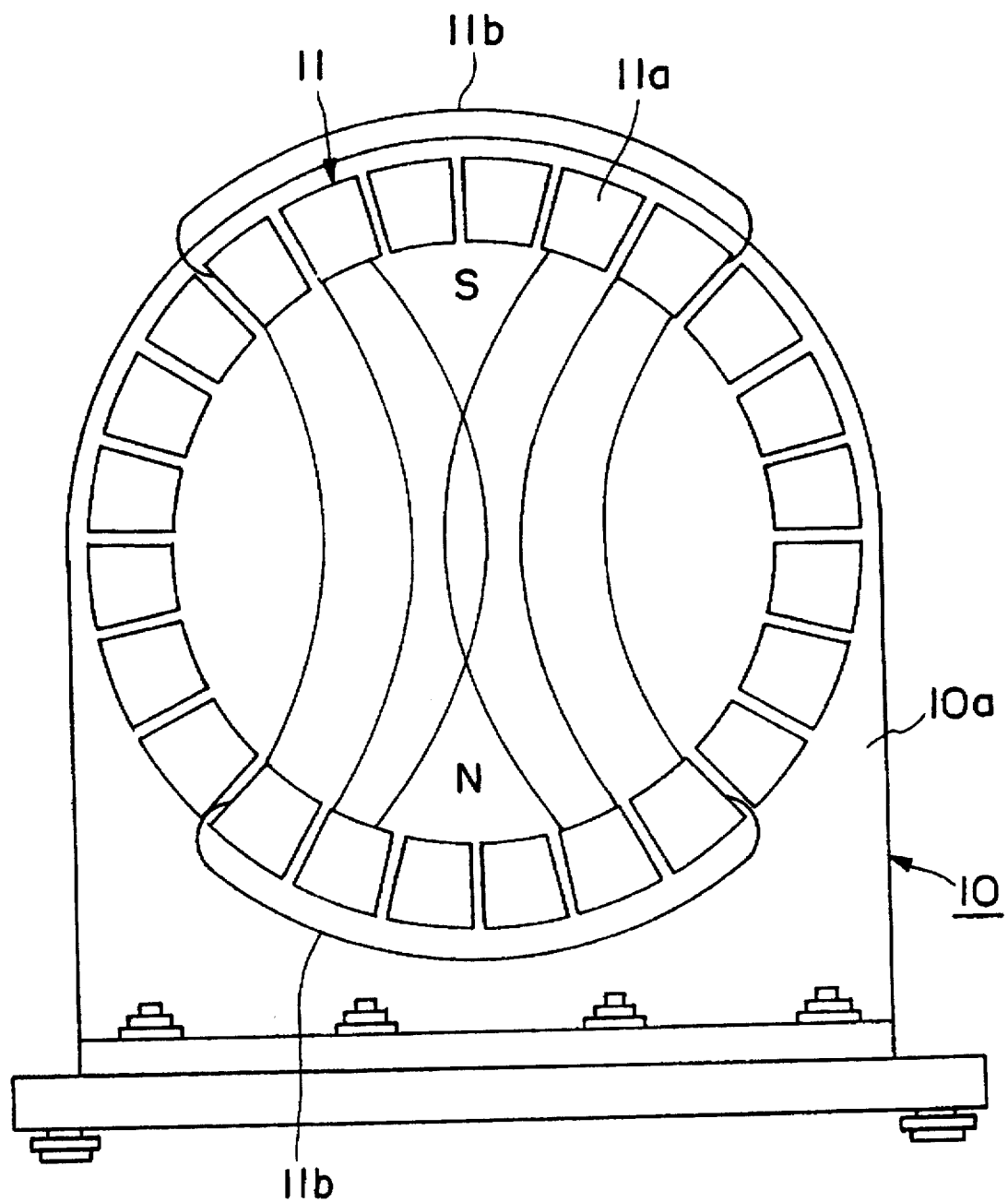
FIG. 4 is a view illustrating a rotating magnetic field generated by an electromagnet of the motor shown in FIG. 1.
Figure 5:
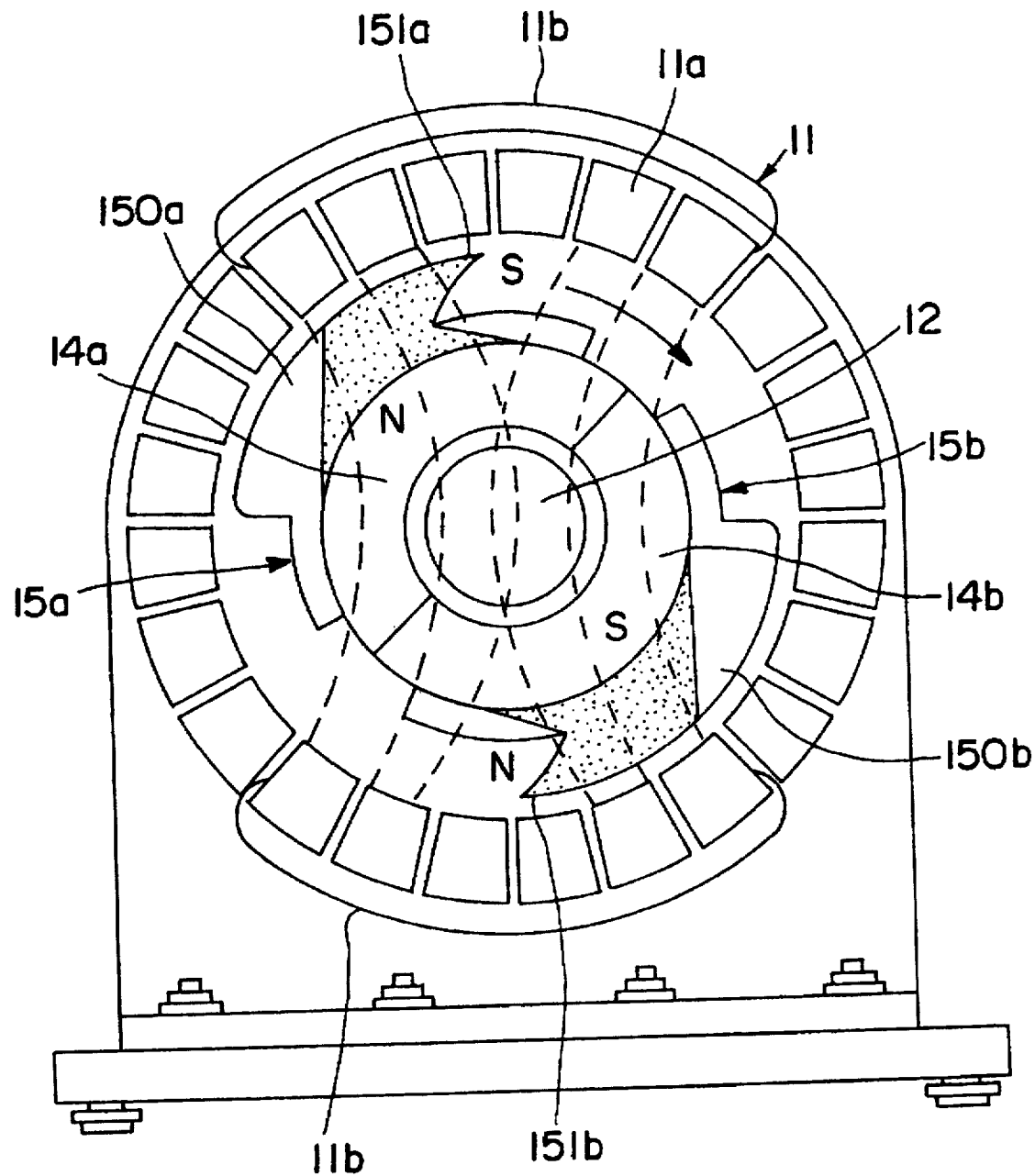
FIG. 5 is a view illustrating a state of convergence of a magnetic flux of the permanent magnets of the motor shown in FIG. 1 when the electromagnet of the motor is excited.

FIGS. 1 to 5 show a first embodiment of a motor of the present invention which is of a single-phase/two-pole type. Referring to FIGS. 1 and 2, an electromagnet 11 constituting a stator is mounted between front and rear side plates 10a of a supporting member 10. The electromagnet 11 includes a cylindrical iron core 11a having 24 pieces of slots, and 12 sets of coils 11b wound around the iron core 11a. The electromagnet 11 generates a rotating magnetic field when having applied thereto a three-phase alternating current. Such a rotating magnetic field is distributed, as shown in FIG. 4, within a plane vertical to a rotation output shaft 12 (described later), and it is rotated, for example, clockwise in FIG. 1.

The above-described rotation output shaft 12 is rotatably mounted by bearings 13 between the front and rear side plates 10a of the supporting member 10 in a rotating magnetic field of the electromagnet 11. Semi-cylindrical permanent magnetics 14a, 14b are disposed around the outer periphery of the rotation output shaft 12 in such a manner as to surround the rotation output shaft 12. As shown in FIGS. 1 and 3, one permanent magnet 14a is magnetized in an N-pole that is reverse to one magnetic pole (S pole) of the rotating magnetic field, while the other permanent magnet 14b is magnetized in an S-pole that is reverse to the other magnetic pole (N-pole) of the rotating magnetic field. The magnetic field produced by the permanent magnets 14a, 14b combined with each other in a cylindrical shape is distributed within a plane vertical to the rotation output shaft 12 as is the rotating magnetic field of the electromagnet 11. The magnetic intensity of the magnetic field produced by the permanent magnets 14a, 14b can be freely set irrespective of the magnetic intensity of the rotating magnetic field of the electromagnet 11.

A magnetic body 15a is disposed outside the permanent magnet 14a in such manner as to surround the permanent magnet 14a and as shown in FIGS. 1 and 2 is integral therewith, while a magnetic body 15b is disposed outside the permanent magnet 14b in such a manner as to surround the permanent magnet 14b and as shown in FIGS. 1 and 2 is integral therewith. A magnetic flux of the permanent magnets 14a, 14b passes through the magnetic bodies 15a, 15b. Here, the wall thickness of each of the magnetic bodies 15a, 15b is set at such a value that the magnetic flux can be converged in a specified direction when a rotating magnetic field is generated from the electromagnet 11. Specifically, if the wall thickness of each of the magnetic bodies 15a, 15b is thinner than the above set value, for example, if it is set at a value nearly equal to a wall thickness of a mild magnetic body provided in a common hybrid type motor, it becomes impossible to achieve the convergence effect of the magnetic flux. Magnetic tooth portions 150a, 150b are respectively integrated with outer peripheral portions of the magnetic bodies 15a, 15b in such a manner as to radially project therefrom. Each of the magnetic tooth portions 150a, 150b has a width nearly equal to that of the rotating magnetic field of the electromagnet 11. The magnetic bodies 15a, 15b are not connected to each other but are spaced apart from each other at an interval as shown in FIG. 1. This is because, if the magnetic bodies are connected to each other, much of the magnetic flux of the permanent magnets 14a, 14b would be confined in the magnetic bodies 14a, 14b. As a result, it would be difficult for the magnetic bodies 14a, 14b to be attracted by the rotating magnetic field and to produce a rotating torque.

The permanent magnets 14a, 14b and the magnetic bodies 15a, 15b are coaxially mounted outside the rotation output shaft 12, and constitute a rotor which is attracted by the rotating magnetic field in the rotating magnetic field of the electromagnet 11 and is rotated together with the rotation output shaft 12.

In the first embodiment, the electromagnet 11 generates a single rotating magnetic field, and is operated with two poles. One end portion of each of the magnetic tooth portions 150a, 150b, that is each of the end portions 151a, 151b in the rotating direction of the rotor, is set at an acute angle, in order that when the magnetic flux of the permanent magnets 14a, 14b passing through the magnetic bodies 15a, 15b is converged on the rotating magnetic field side, a large rotating torque is produced. That is, the inclination of the magnetic line of force in an interval between the magnetic tooth portions 150a, 150b and the iron core 11a of the electromagnet 11 is increased. In other words, a rotating torque can be effectively obtained upon start of the motor. Each of the magnetic bodies 15a, 15b may be made of an iron material, or a magnetic material having a high permeability such as a silicon steel plate or permalloy; however, in this embodiment, it is made of a mild magnetic material.

The function of the first embodiment will be described below.

When a three-phase alternating current is not applied to the electromagnet 11, the magnetic flux of the permanent magnets 14a, 14b passing through the magnetic bodies 15a, 15b is spread over the entire magnetic bodies 15a, 15b. On the contrary, when a three-phase alternating current is applied to the electromagnet 11 and a rotating magnetic field is generated, the magnetic flux is converged on the rotating magnetic field side, and is concentrated at the end portions 151a, 151b of the magnetic tooth portions 150a, 150b (see stippled portions of FIG. 5). As a result, the magnetic line of force is largely inclined in an interval portion between the magnetic tooth portions 150a, 150b and the iron core 11a of the electromagnet 11, to generate an initial torque rotating clockwise. Thus, the rotor instantly comes to a synchronous state, and is transferred to a synchronous operating state, that is a state operated by the rotating torque generated depending on a load angle θ between a magnetic axis of the rotating magnetic field and that of the rotor.

In other words, when a rotating torque is intended to be generated by an attracting force generated between the rotating magnetic field and the magnetic tooth portions 150a, 150b, the magnetic flux of the permanent magnets 14a, 14b within the rotor is converged by the rotating magnetic field upon transmission through the magnetic bodies 15a, 15b. Accordingly, the rotor instantly comes into a synchronous operating state.

The results of an operating test at the initial operation of the motor of the first embodiment will be described below.

The magnetic body was formed of mild steel in a shape shown in FIG. 1. The permanent magnet was made of a samarium containing cobalt alloy (SmCo). The magnetic intensity of the permanent magnet was 12,000 gauss. A commercial induction motor, for example, a three-phase induction motor, Hitachi "TFO-OK" (maximum output: 310 W) was used as the electromagnet. The revolution speed of the motor was measured using a digital tachometer, "HT-4100" by Ono Sokki.

In the operating test for the motor under the above condition, a period of time required for reaching a specified revolution speed was measured, with a result that the motor instantly reached the revolution speed of 1,430 RPM. The result thus obtained was comparable to that of the commercial induction motor. The test result shows that the motor of the first embodiment, which is similar in structure to a common synchronous motor but does not include a squirrel-cage rotor, allows self-starting.

In the first embodiment, since the squirrel-case rotor in a common synchronous motor is replaced with the magnetic bodies, the size of the motor can be significantly reduced. Moreover, since a rotating torque is proportional to the intensities of the rotating magnetic field of the electromagnet 11 and the magnetic field of the permanent magnets 14a, 14b, a high torque can be obtained by the use of permanent magnets with a high magnetic intensity.

The magnetic bodies may be mounted on the rotation output shaft 12 in such a manner as to be eccentric thereto. In this case, the magnetic flux of the permanent magnets can be converged without provision of the magnetic tooth portions, to obtain a rotating torque upon start of rotation.

A second embodiment of the present invention will be described with reference to FIGS. 6 to 9. In this embodiment, a motor of a three-phase/four-pole type is used. In addition, parts corresponding to those shown in FIGS. 1 to 5 are indicated by the same reference characters, and explanation thereof is omitted.

Figure 6:
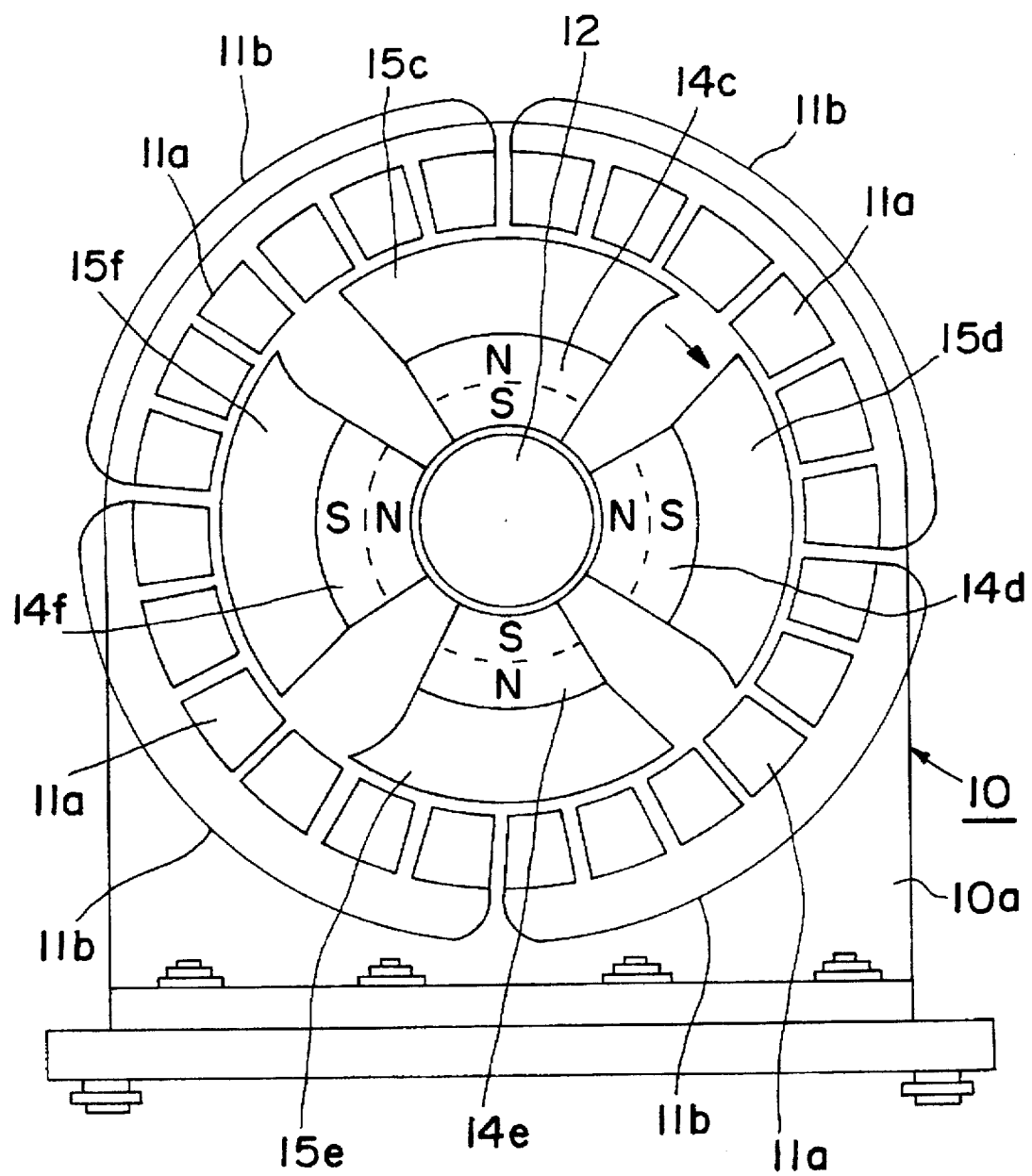
FIG. 6 is a schematic side view of a second embodiment of the motor according to the present invention, with parts partially cutaway.
Figure 7:
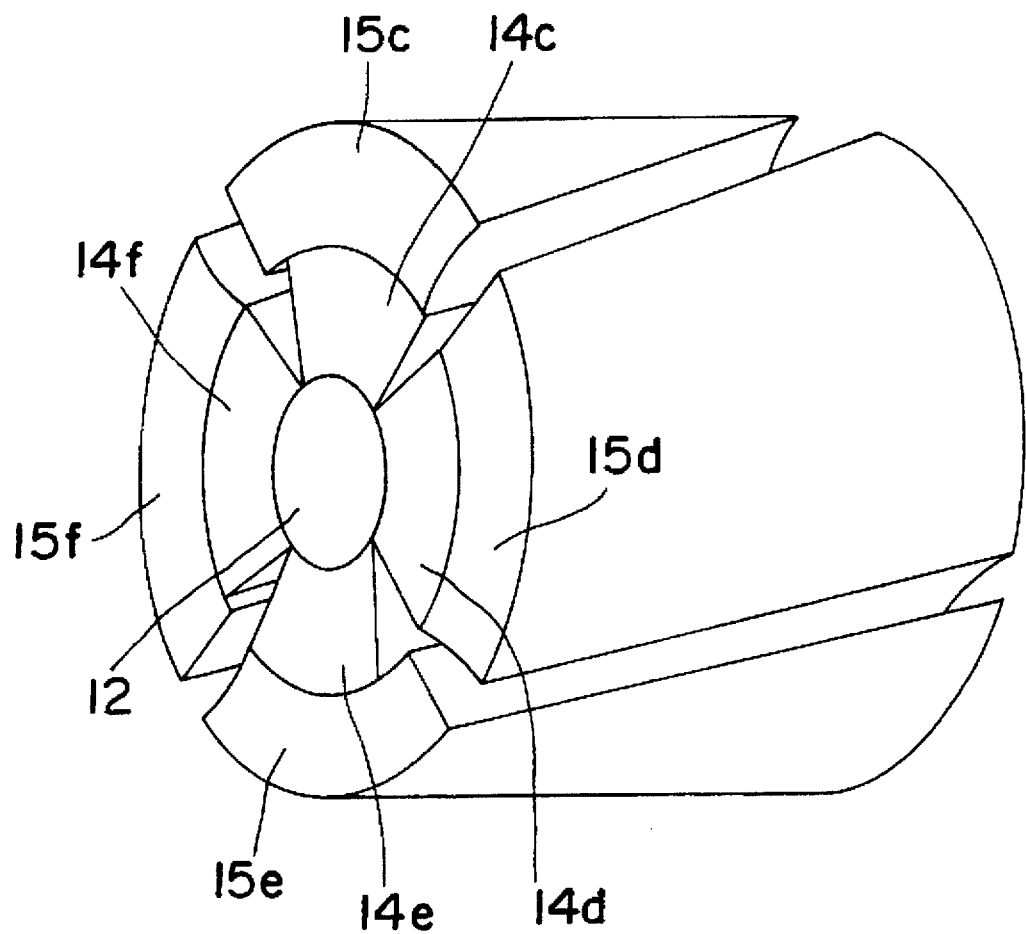
FIG. 7 is a perspective view of a rotor portion of the motor shown in FIG. 6.
Figure 8:
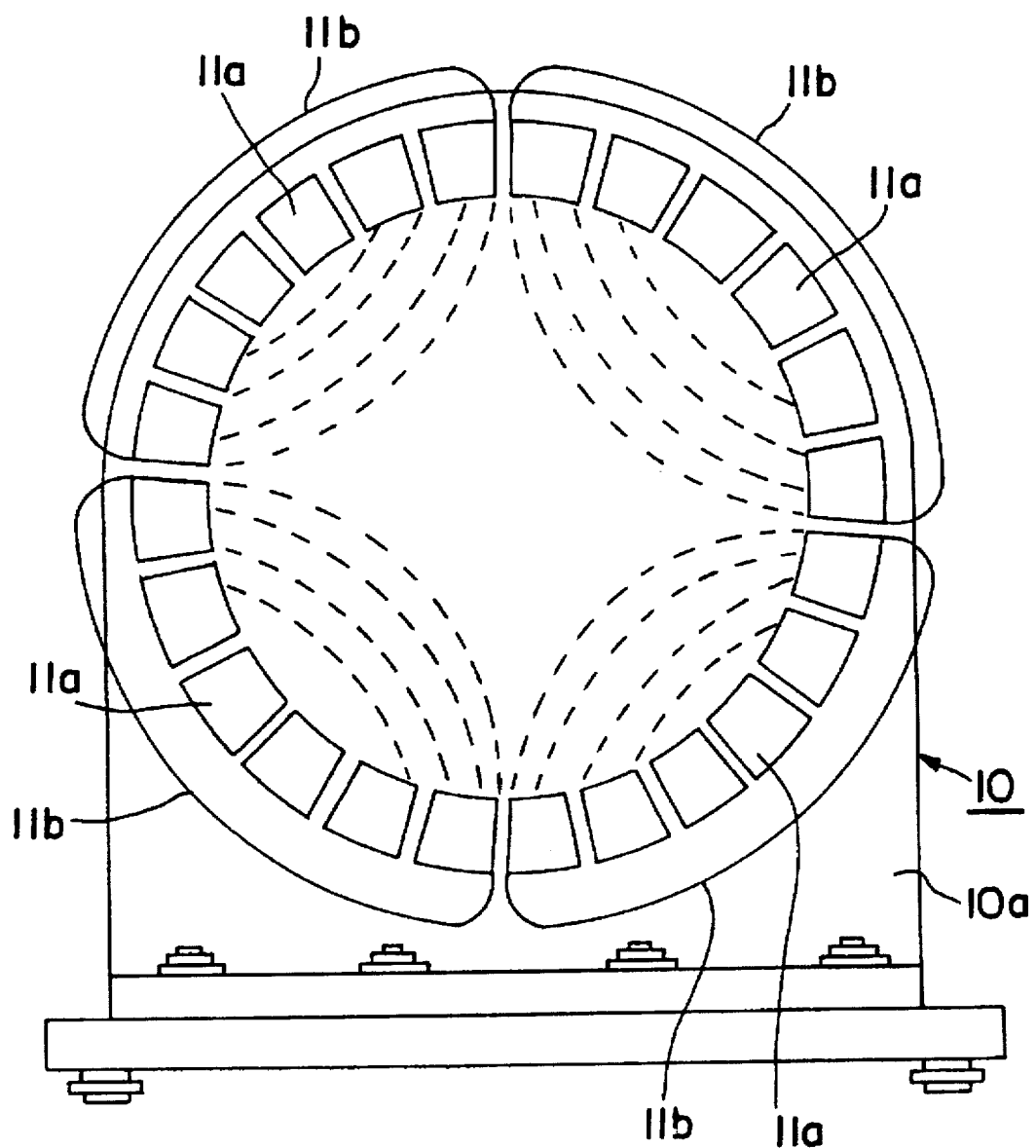
FIG. 8 is a view illustrating a rotating magnetic field generated by an electromagnet of the motor shown in FIG. 6.

According to the second embodiment, referring to FIG. 6, coils 11b are wound around a cylindrical iron core 11a having 24 pieces of slots. When a three-phase alternating current is applied to the coils 11b, a rotating magnetic field within a plane vertical to a rotation output shaft 12 as shown in FIG. 8 is generated. Four permanent magnets 14c to 14f are disposed around the rotation output shaft 12. Each of the permanent magnets 14c to 14f is made of a permanent magnet material such as a samarium containing cobalt alloy (SmCo) or ferrite, and it is magnetized in a polarity reverse to that of the rotating magnetic field. Referring to FIG. 6, in the case of each of the permanent magnets 14c and 14e, the outside thereof (the electromagnetic 11 side) is magnetized in an N-pole and the inside thereof (the rotation output shaft 12 side) is magnetized at an S pole; while in the case of the permanent magnets 14d and 14f, the outside (the electromagnet 11 side) is magnetized in the S-pole and the inside (the rotation output shaft 12 side) is magnetized in the N-pole. The magnetic fields produced by the permanent magnets 14c to 14f are distributed in a plane vertical to the rotation output shaft 12, as is the rotating magnetic field of the electromagnet 11. The magnetic intensity of each of the permanent magnets 14c to 14f can be freely set irrespective of the magnetic intensity of a rotating magnetic field produced by the electromagnet 11. Magnetic bodies 15c to 15f are provided outside the permanent magnets 14c to 14f, respectively. Each of the magnetic bodies 15c to 15f is made of an iron material or a magnetic material having a high permeability such as a silicon steel plate or permalloy. A magnetic flux of the permanent magnets 14c to 14f passes through the magnetic bodies 15c to 15f. The wall thickness of each of the magnetic bodies 15c to 15f is set at such a value that the magnetic flux is allowed to be converged in a specified direction. For example, the wall thickness of the magnetic body is set to be in a range of from 10 mm to 15 mm.

In the second embodiment, the permanent magnets 14c to 14f and the magnetic bodies 15c to 15f constitute a rotor which is attracted by the rotating magnetic field in the rotating magnetic field of the electromagnet 11 and is rotated together with the rotation output shaft 12.

Figure 9:
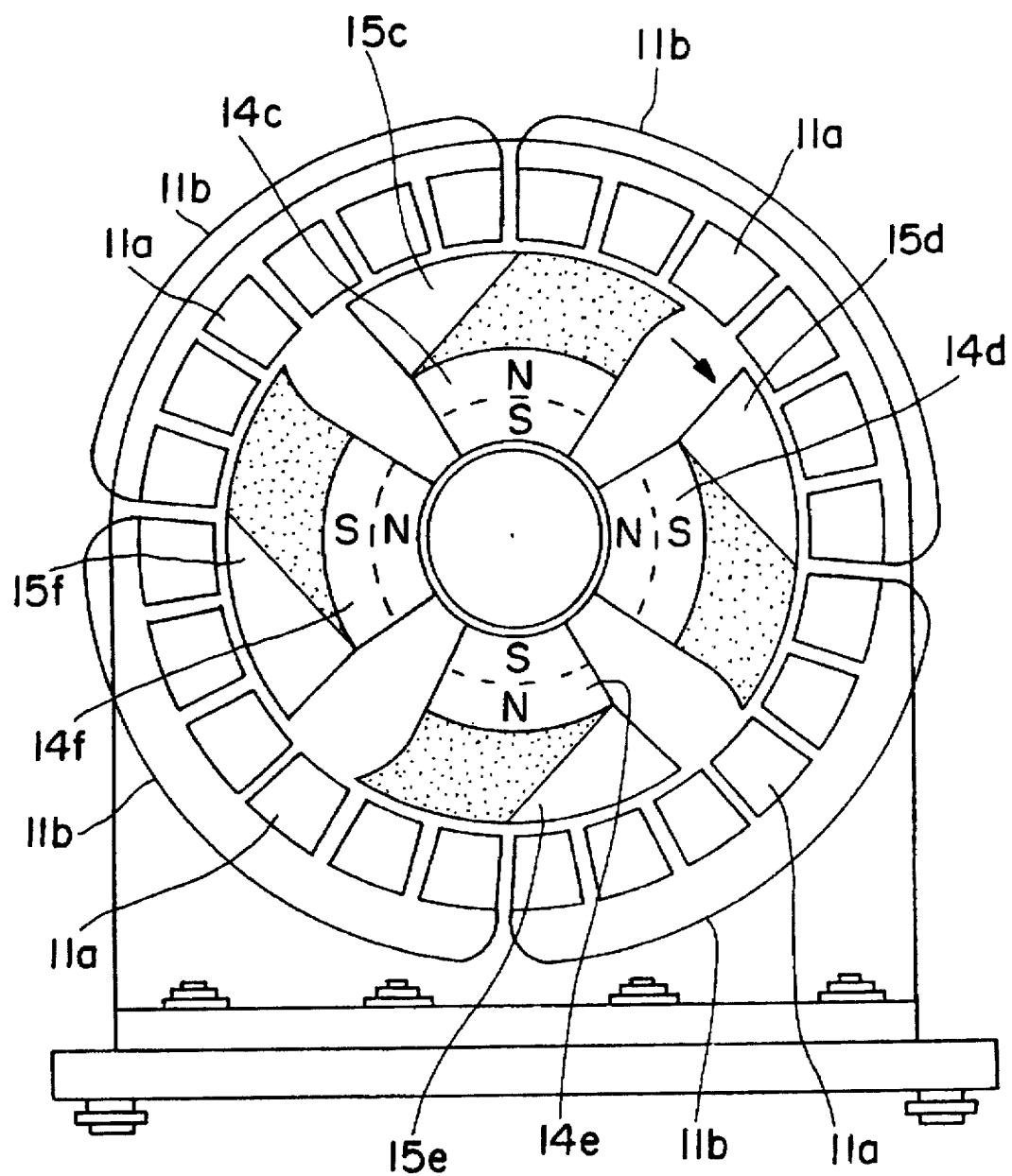
FIG. 9 is a view illustrating a state of convergence of a magnetic flux of permanent magnets of the motor shown in FIG. 6 when the electromagnet of the motor is excited.

Even in this embodiment, when a rotating magnetic field is generated by applying a three-phase alternating current to the electromagnet 11, the magnetic flux, equally distributed in the magnetic bodies 15c to 15f, of the permanent magnets 14c to 14f is converged on the rotating magnetic field side, and is concentrated at end portions, in the rotating direction, of the magnetic bodies 15c to 15f (see stippled portions in FIG. 9). Consequently, a magnetic line of force is largely inclined in an interval portion between the magnetic bodies 15c to 15f and the iron core 11a of the electromagnet 11, that is, in an interval portion between the rotor and the stator, to generate a rotating torque. Thus, the motor instantly comes to a synchronous operating state.

The results of an operating test for the motor of the second embodiment will be described.

Figure 10:
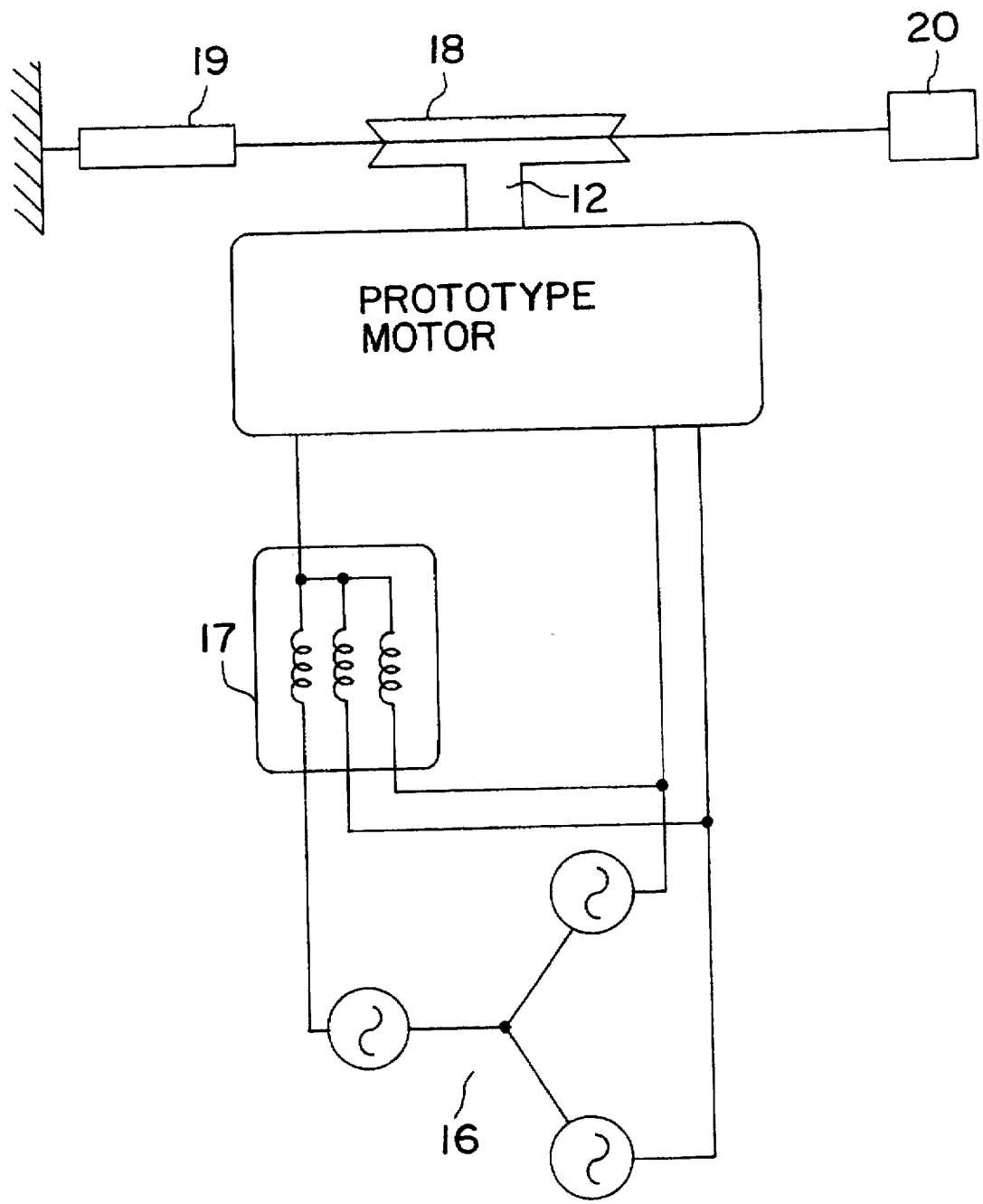
FIG. 10 is a schematic view of an apparatus used for test of operating the motor in the second embodiment.

FIG. 10 schematically shows an apparatus used in the operating test. In the figure, reference numeral 16 indicates a three-phase power source variable in frequency and voltage, KIKUSUI "PCR500L" and "3P02-PCR-L"; 17 is a power factor met YOKOGAWA "67AR0228"; 18 is a pulley (diameter: 60 mm$\phi$) fixed on the rotation output shaft 12 of a prototype motor of the second embodiment; 19 is a spring balancer by KAMOSIRA SEIKOUSHO (applicable range: 2 kg to 5 kg); and 20 is a weight. In addition, a tachometer, ONO SOKKI "HT-4100" was used.

Figure 11:
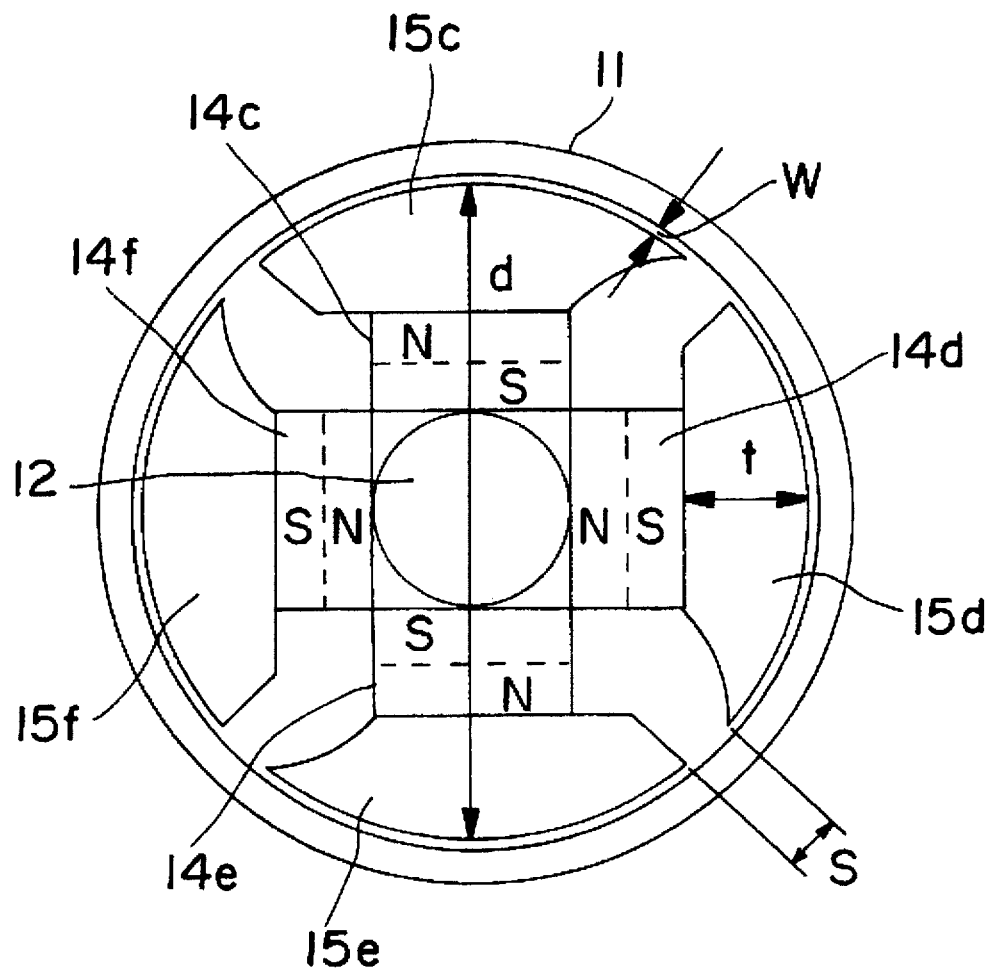
FIG. 11 is a sectional view of a prototype motor according to the second embodiment.

FIG. 11 shows the cross-section of the prototype motor. Here, the motor case and the stator of the motor are diverted from those of a commercial induction motor of a three-phase/four-pole type (200 V, 100 W). The motor case has dimensions: 124.5 mm (axial length), and 115.5 mm (outside diameter). The stator has dimensions: 40 mm (axial length); 111.7 mm (outside diameter); and 67.5 mm (inside diameter). The diameter of the rotation output shaft 12 is 17.5 mm$\phi$. A permanent magnet, SUMITOMO Metal Industries, Ltd. "NEOMAX-40", was used as each of the permanent magnets 14c to 14f. Each of the permanent magnets 14c to 14f has a size of 10 mm (thickness)×20 mm (width)×40 mm (length). The following five kinds of prototype motors were prepared.

No. 1 Motor diameter "d" of rotor 66 mm$\phi$ interval "s" between magnetic bodies 5 mm thickness "t" of magnetic body 10 mm interval "w" between rotor and stator 0.5 mm No. 2 Motor
- diameter "d" of rotor 66 mmφ
- interval "s" between magnetic bodies 10 mm
- thickness "t" of magnetic body 13 mm
- interval "w" between rotor and stator 0.5 mm No. 3 Motor
- diameter "d" of rotor 66 mmφ
- interval "s" between magnetic bodies 8 mm
- thickness "t" of magnetic body 5 mm
- interval "w" between rotor and stator 0.5 mm No. 4 Motor
- diameter "d" of rotor 66.3 mmφ
- interval "s" between magnetic bodies 6 mm
- thickness "t" of magnetic body 13 mm
- interval "w" between rotor and stator 0.35 mm No. 5 Motor
- diameter "d" of rotor 66 mmφ
- interval "s" between magnetic bodies 7 mm
- thickness "t" of magnetic body 10 mm
- interval "w" between rotor and stator 0.5 mm With respect to each of the above prototype motors set in the apparatus shown in FIG. 10, a phase voltage (V), a phase current (A), a power factor (COS), a revolution speed (RPM), and a torque (kg×cm) were measured. In this test, a frequency and a voltage of the three-phase power source 16, and a magnitude of the weight 20 were varied.

Operating Test of No. 1 Motor

The operating test was carried out under the conditions that the weight (load) was set at 3.5 kg; the frequency was changed in a range of from 50 to 60 Hz; and the input voltage was changed in a range of from 100 V to 115 V. The results are shown in Table 1. For comparison, the above common induction motor of a three-phase/four-pole type was tested in the same condition. The results are shown in Table 2.

TABLE 1

| LOAD | INPUT | | | | | OUTPUT | | | |
|---|---|---|---|---|---|---|---|---|---|
| Kg | Hz | V | A | COS | W | RPM | Kg-cm | W | % |
| 3.5 | 50 | 100 | 0.54 | 0.99 | 160.4 | 1500 | 8.55 | 131.7 | 82.0 |
| " | 50 | 110 | 0.45 | 0.90 | 134.0 | 1500 | 7.05 | 109.0 | 81.3 |
| " | 50 | 115 | 0.51 | 0.83 | 146.0 | 1500 | 7.65 | 118.0 | 80.8 |
| " | 50 | 115 | 0.55 | 0.88 | 167.0 | 1500 | 9.00 | 138.6 | 83.0 |
| " | 50 | 115 | 0.51 | 0.97 | 110.7 | 1590 | 9.00 | 146.9 | 83.0 |
| " | 55 | 100 | 0.68 | 0.90 | 183.6 | 1650 | 8.70 | 146.9 | 80.0 |
| " | 55 | 110 | 0.48 | 0.99 | 158.0 | 1650 | 7.65 | 129.0 | 81.6 |
| " | 55 | 115 | 0.45 | 0.97 | 150.0 | 1650 | 7.50 | 127.0 | 84.7 |
| " | 55 | 115 | 0.53 | 0.99 | 181.0 | 1650 | 9.00 | 152.5 | 84.0 |
| " | 60 | 100 | 0.68 | 0.75 | 193.5 | 1800 | 8.70 | 161.0 | 83.0 |
| " | 60 | 115 | 0.60 | 0.97 | 200.8 | 1800 | 9.00 | 166.3 | 83.0 |

TABLE 2

| LOAD | INPUT | | | | | OUTPUT | | | |
|---|---|---|---|---|---|---|---|---|---|
| Kg | Hz | V | A | COS | W | RPM | Kg-cm | W | % |
| 3.0 | 50 | 105 | 0.77 | 0.74 | 179.5 | 1403 | 8.70 | 125.3 | 69.8 |
| " | 50 | 115 | 0.79 | 0.68 | 185.3 | 1421 | 8.85 | 129.1 | 69.7 |
| " | 50 | 100 | 0.77 | 0.77 | 177.0 | 1395 | 8.85 | 127.0 | 71.0 |
| " | 55 | 100 | 0.80 | 0.80 | 192.0 | 1518 | 8.85 | 138.0 | 71.8 |
| " | 60 | 100 | 0.86 | 9.85 | 219.0 | 1633 | 8.85 | 148.0 | 67.0 |

TABLE 2-continued

| LOAD | INPUT | | | | | OUTPUT | | | |
|---|---|---|---|---|---|---|---|---|---|
| Kg | Hz | V | A | COS | W | RPM | Kg-cm | W | % |
| " | 50 | 115 | 0.77 | 0.68 | 181.0 | 1422 | 8.85 | 131.0 | 72.0 |
| " | 55 | 115 | 0.78 | 0.74 | 199.0 | 1551 | 8.85 | 143.0 | 71.0 |
| " | 60 | 115 | 0.79 | 0.78 | 212.0 | 1675 | 8.85 | 152.0 | 71.0 |

As is apparent from Tables 1 and 2, the motor of this embodiment is higher than the common induction motor in input-output ratio (efficiency). Namely, the input-output ratio in the motor of this embodiment is higher than 80%.

Operating Test of No. 2 Motor

An operating test was carried out with conditions that the weight (load) was set at 2.5 kg and the input voltage was changed in a range of from 90 V to 115 V while the frequency was kept at 45 Hz. Another operating test was carried out under the conditions that the weight (load) was set at 2.5 kg and the input voltage was changed in a range of from 95 V to 115 V while the frequency was kept at 50 Hz. A further operating test was carried out under the conditions that the weight (load) was set at 2.5 kg and the input voltage is changed in a range of from 105 V to 115 V while the frequency was kept at 55 Hz. The results are shown in Table 3.

TABLE 3

| LOAD | INPUT | | | | | OUTPUT | | | |
|---|---|---|---|---|---|---|---|---|---|
| Kg | Hz | V | A | COS | W | RPM | Kg-cm | W | % |
| 2.5 | 45 | 90 | 0.47 | 0.97 | 123.1 | 1350 | 6.30 | 87.3 | 70.9 |
| " | " | 95 | 0.43 | 0.97 | 118.9 | " | " | " | 73.4 |
| " | " | 100 | 0.47 | 0.78 | 110.0 | " | " | " | 79.4 |
| " | " | 105 | 0.61 | 0.62 | 119.4 | " | " | " | 73.4 |
| " | " | 110 | 0.77 | 0.58 | 147.4 | " | " | " | 59.2 |
| " | " | 115 | 0.92 | 0.52 | 165.0 | " | " | " | 52.9 |
| 2.5 | 50 | 95 | 0.48 | 0.80 | 112.0 | 1500 | 6.30 | 97.0 | 86.6 |
| " | " | 100 | 0.38 | 0.99 | 113.0 | " | " | " | 85.8 |
| " | " | 105 | 0.37 | 0.96 | 112.0 | " | " | " | 86.6 |
| " | " | 110 | 0.45 | 0.76 | 113.5 | " | " | " | 85.8 |
| 2.5 | 55 | 105 | 0.43 | 0.90 | 122.0 | 1650 | 6.30 | 106.7 | 87.5 |
| " | " | 110 | 0.35 | 0.99 | 115.1 | " | " | " | 92.8 |
| " | " | 115 | 0.38 | 0.96 | 125.9 | " | " | " | 84.7 |

As is apparent from Table 3, in the case where the frequency is set at 50 Hz, the input-output ratio (efficiency) is more than or equal to 80%.

Operating Test of No. 3 Motor

An operating test was carried out under the conditions that the weight (load) was set at 3 kg, the frequency was set at 50 Hz and 55 Hz, and the input voltage was changed in a range of from 110 V to 115 V. The results are shown in Table 4.

TABLE 4

| LOAD | INPUT | | | | | OUTPUT | | | |
|---|---|---|---|---|---|---|---|---|---|
| Kg | Hz | V | A | COS | W | RPM | Kg-cm | W | % |
| 3.0 | 50 | 110 | 0.47 | 0.90 | 139.0 | 1500 | 7.20 | 105.0 | 75.0 |
| " | " | 115 | 0.53 | 0.77 | 141.0 | " | " | 111.0 | 76.0 |

TABLE 4-continued

| LOAD | INPUT | | | | | OUTPUT | | | |
|---|---|---|---|---|---|---|---|---|---|
| Kg | Hz | V | A | COS | W | RPM | Kg-cm | W | % |
| " | 55 | 110 | 0.46 | 0.99 | 151.0 | 1650 | " | 122.0 | 80.8 |
| " | " | 115 | 0.46 | 0.98 | 155.0 | " | 7.35 | 125.0 | 80.6 |

Operating Test of No. 4 Motor

An operating test was carried out under the conditions that the weight (load) was set at 3 kg, 3.5 kg and 3.6 kg, the frequency was set at 50 Hz and 55 Hz, and the input voltage was set at 100 V and 115 V. The results shown in Tables 5 and 6.

TABLE 5

| LOAD | INPUT | | | | | OUTPUT | | | |
|---|---|---|---|---|---|---|---|---|---|
| Kg | Hz | V | A | COS | W | RPM | Kg-cm | W | % |
| 3.0 | 50 | 110 | 0.45 | 0.98 | 140.0 | 1500 | 7.65 | 118.0 | 84.2 |
| " | " | 115 | 0.48 | 0.88 | 146.0 | " | 7.65 | 118.0 | 80.8 |
| " | 55 | 110 | 0.50 | 0.96 | 158.0 | 1650 | 7.50 | 127.0 | 80.3 |
| " | " | 115 | 0.45 | 0.99 | 154.0 | " | 7.35 | 124.0 | 80.5 |
| 3.5 | 50 | 100 | 0.54 | 0.95 | 154.0 | 1500 | 8.25 | 127.0 | 82.0 |
| " | " | 105 | 0.48 | 0.99 | 150.0 | " | " | " | 85.0 |
| " | " | 110 | 0.47 | 0.98 | 152.0 | " | " | " | 84.0 |
| " | " | 115 | 0.51 | 0.90 | 177.0 | " | " | " | 72.0 |
| 3.5 | 55 | 100 | 0.70 | 0.84 | 176.0 | 1650 | 8.25 | 140.0 | 79.5 |
| " | " | 105 | 0.66 | 0.90 | 187.0 | " | 8.85 | 150.0 | 80.0 |
| " | " | 110 | 0.63 | 0.96 | 199.5 | " | 9.00 | 152.0 | 76.0 |
| " | " | 115 | 0.60 | 0.99 | 206.0 | " | 9.30 | 158.0 | 77.0 |
| " | " | 115 | 0.54 | 0.99 | 185.0 | " | 9.15 | 155.0 | 84.0 |

TABLE 6

| LOAD | INPUT | | | | | OUTPUT | | | |
|---|---|---|---|---|---|---|---|---|---|
| Kg | Hz | V | A | COS | W | RPM | Kg-cm | W | % |
| 3.6 | 50 | 115 | 0.47 | 0.74 | 119.9 | 1500 | 6.30 | 97.0 | 80.0 |
| " | " | 115 | 0.47 | 0.86 | 139.0 | " | 8.85 | 136.0 | 98.0 |
| " | " | 115 | 0.51 | 0.93 | 160.0 | " | 9.15 | 141.0 | 86.0 |
| " | " | 115 | 0.52 | 0.92 | 165.0 | " | 9.00 | 139.0 | 84.0 |
| " | " | 115 | 0.49 | 1.00 | 169.0 | " | 9.30 | 143.0 | 85.0 |

As is apparent from Tables 5 and 6, the input-out ratio (efficiency) is excellent, and it often reaches 98%.

In this test, an interval between the stator and the rotor is not equalized, but is slightly widened on the end portion side, in the rotating direction, of the magnetic body.

Operating Test of No. 5 Motor

An operating test was carried out under the conditions that the weight (load) was changed in a range of from 2.5 kg to 4.5 kg, the frequency was set at 40 Hz and 45 Hz, and the input voltage was changed in a range from 80 to 110 V. The results are shown in Table 7.

TABLE 7

| LOAD | INPUT | | | | | OUTPUT | | | |
|---|---|---|---|---|---|---|---|---|---|
| Kg | Hz | V | A | COS | W | RPM | Kg-cm | W | % |
| 2.5 | 40 | 80 | 0.45 | 0.94 | 105.0 | 1200 | 6.45 | 79.0 | 75.2 |
| " | " | 100 | 0.64 | 0.65 | 124.8 | " | 6.15 | 75.8 | 60.7 |
| 3.7 | " | 100 | 0.66 | 0.81 | 160.0 | " | 9.15 | 113.0 | 70.6 |
| 4.5 | " | 105 | 0.76 | 0.79 | 189.0 | " | 11.55 | 142.0 | 75.1 |
| 2.5 | 45 | 105 | 0.53 | 0.85 | 93.7 | 1350 | 7.20 | 93.7 | 100.0 |
| 2.6 | 40 | 80 | 0.33 | 0.99 | 78.4 | 1200 | 6.90 | 78.4 | 100.0 |
| 3.7 | " | 90 | 0.53 | 0.95 | 136.0 | " | 9.45 | 116.0 | 85.3 |
| 4.8 | " | 100 | 0.69 | 0.86 | 178.0 | " | 11.10 | 137.0 | 76.9 |
| 4.3 | " | 110 | 0.87 | 0.70 | 201.0 | " | 11.25 | 139.0 | 69.1 |

As is apparent from Table 7, a variation in input-output ratio (efficiency) is present but the efficiency is excellent in accordance with the operating condition.

The results of an operating test for examining the relationship between a wall thickness of a magnetic body and an input-output ratio (efficiency) will be described below.

Figure 12:
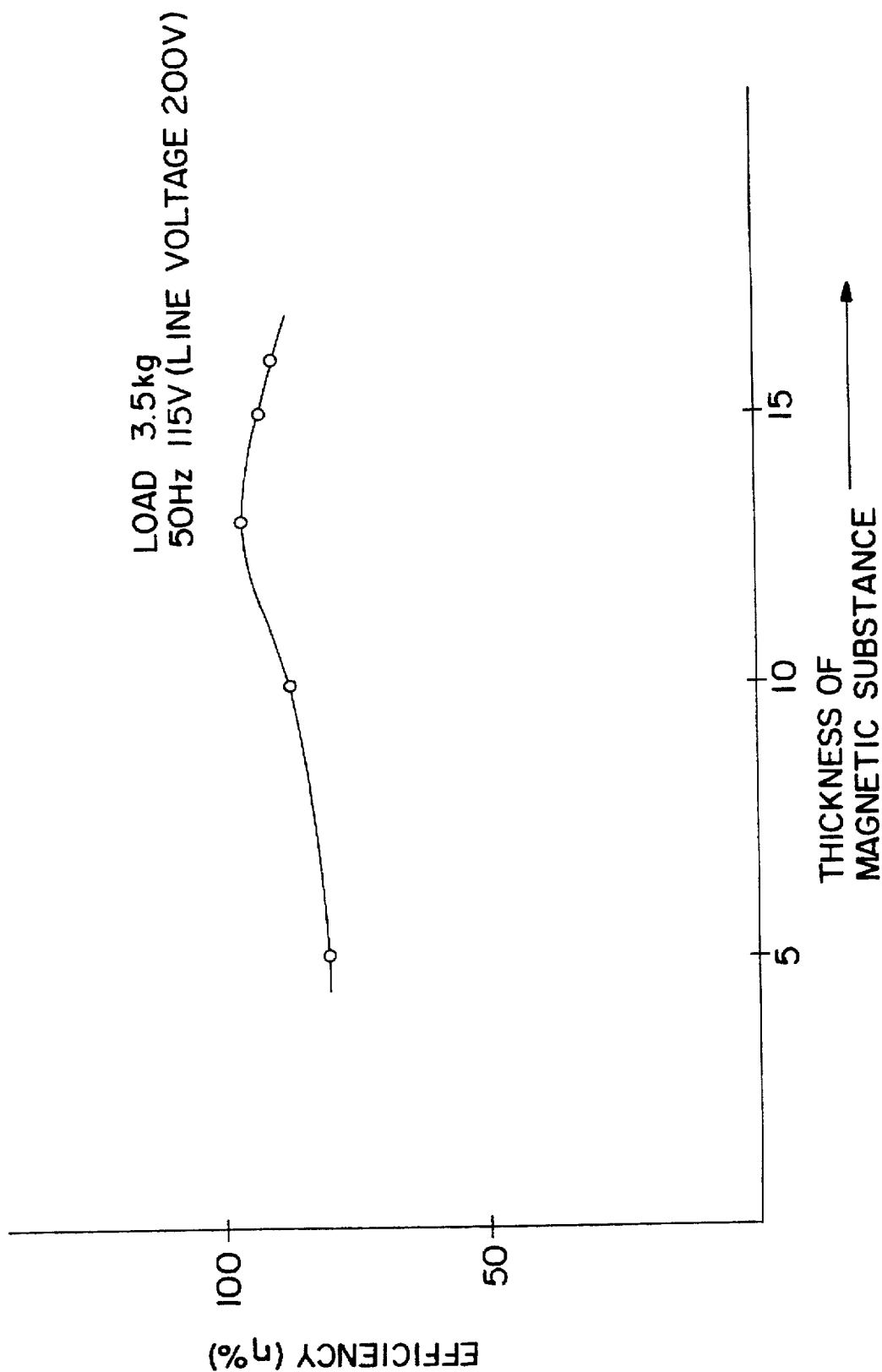
FIG. 12 is a graph showing the relationship between a thickness of a magnetic body and an input-output ratio (efficiency: η %) with respect to the prototype motor shown in FIG. 11.
Figure 13:
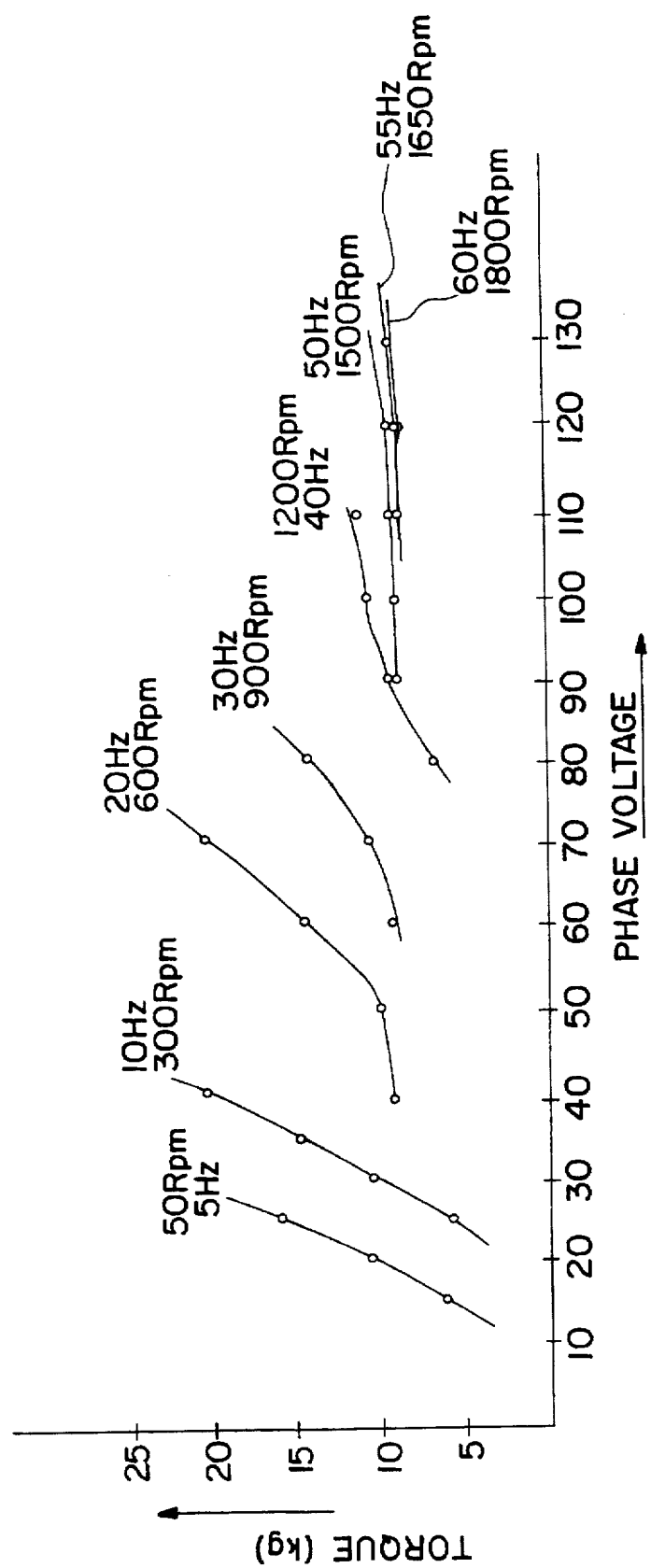
FIG. 13 is a graph showing the relationship between a phase voltage (V) and an output torque (Kg×cm)

Using the apparatus shown in FIG. 10, an input-output ratio (efficiency) depending on a wall thickness (5 mm and 16 mm) of the magnetic body was examined under the conditions that the weight (load) was set at 3.5 kg, the frequency was set at 50 Hz and the input voltage was set at 115 V (line voltage: 200 V). The results are shown in FIG. 12. As is apparent from FIG. 12, the input-output ratio (efficiency) is changed depending on a wall thickness of the magnetic body. For example, in this test, an input-output ratio of 98% was obtained when the wall thickness of the magnetic body was set at around 13 mm. The relationship between a phase voltage (V) and an output torque (kg×cm) was also obtained. The results are shown in FIG. 13. As is apparent from FIG. 13, a high torque can be obtained even at a low speed operation (15 kg×cm for 5 Hz; and 20 kg×cm for 10 Hz), and consequently, the motor allows continuous variable transmission using an invertor.

Figure 14:
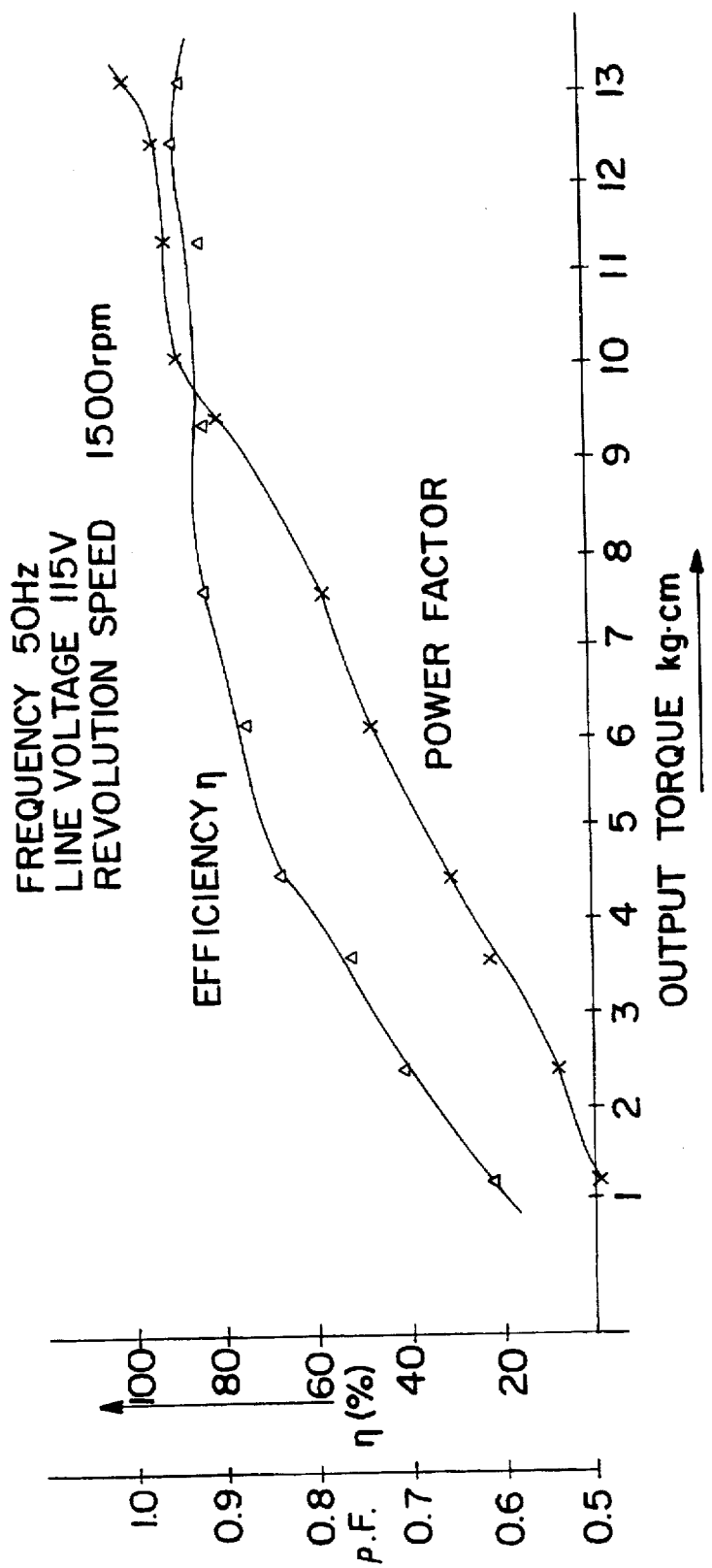
FIG. 14 is a graph showing the relationship between an output torque (Kg×cm), a power factor ρF (COS), and an input-output ratio (efficiency).

The relationship between an output torque (kg×cm) and a power factor pF(COS), and the relationship between an output torque (kg×cm) and an input-output ratio (efficiency) were examined under the conditions that the frequency was set at 50 Hz, the line voltage was set at 115 V, and the revolution speed was set at 1500 rpm. The results are shown in FIG. 14.

For the motor in the second embodiment, as is apparent from the results of the operating tests, the input-output ratio (efficiency) is varied depending on a load, a frequency, an input voltage and the like, so that energy saving can be significantly improved by adjusting these operating factors under fuzzy control and usually operating the motor at the maximum efficiency in accordance with a variable load.

The present invention is not limited to the single-phase/ two-pole motor shown in the first embodiment and to the three-phase/four-pole motor shown in the second embodiment, but it may be also applied to a multi-phase/ multi-pole motor.

As described above, according to the present invention, magnetic bodies through which a magnetic flux of a permanent magnet passes are disposed around the permanent magnet disposed in a rotating magnetic field, and when an electromagnet is excited, the magnetic flux of the permanent magnet is converged on the rotating magnetic field side and thereby the permanent magnet is rotated together with the rotating magnetic field. Accordingly, the motor of the present invention allows self-starting without provision of any squirrel-cage rotor, and thereby it can be reduced in size. Moreover, the energy efficiency can be easily increased up to 80% or more in accordance with the operating condition. In addition, a high torque can be obtained by the use of a permanent magnet with a high magnetic intensity.

I claim:

1. A power generator for converting magnetic energy into motive power, said power generator comprising:
    an electromagnet fixed on a supporting member and operable to generate a rotating magnetic field by application of an alternating current to a coil of said electromagnet;
    a rotation output shaft rotatably supported on said supporting member in such a manner as to be positioned in said rotating magnetic field;
    a permanent magnet disposed around said rotation output shaft for rotation therewith, said permanent magnet having a polarity reverse to that of said rotating magnet field;
    a plurality of magnetic bodies integral with said permanent magnet radially outwardly thereof in such a manner as to be rotatable with said permanent magnet and said rotation output shaft;
    each of said magnetic bodies having formed on an outer periphery thereof a magnetic tooth portion defined as a partial projection in a radially outward direction;
    a magnetic flux of said permanent magnet passing through said magnetic bodies, and each of said magnetic bodies having a wall thickness of a value such that, when said electromagnet is excited, said magnetic flux in said each magnetic body is converged on a side of said rotating magnetic field; and
    whereby, when said electromagnet is excited, said magnetic flux is rotated together with said rotating magnetic field, thereby imparting a rotating torque to said rotation output shaft.

2. A power generator according to claim 1, wherein an interval is provided between adjacent ones of said plurality of said magnetic bodies.

3. A power generator according to claim 1, wherein said permanent magnet is made of a samarium containing cobalt alloy having a magnetic intensity of 12,000 gauss.

4. A power generator according to claim 1, wherein each of said magnetic bodies is mounted eccentrically relative to said rotation output shaft.

5. A power generator according to claim 1, wherein said electromagnet is of a single-phase/two-pole type.

6. A power generator according to claim 1, wherein said electromagnet is of a three-phase/four-pole type.

7. A power generator according to claim 6, wherein a wall thickness of each of said magnetic bodies is within a range of from 10 mm to 15 mm.

8. A power generator according to claim 1, wherein an interval between said electromagnet and each of said magnetic bodies is greater at an end portion of said each magnetic body, relative to a rotating direction, that other portions thereof.

9. A power generator according to claim 1, wherein each said magnetic body is connected at a radially inner portion thereof to said permanent magnet.

10. A power generator for converting magnetic energy into motive power, said power generator comprising:
    an electromagnet fixed on a supporting member and operable to generate a rotating magnetic field by application of an alternating current to a coil of said electromagnet;
    a rotation output shaft rotatably supported on said supporting member in such a manner as to be positioned in said rotating magnetic field;
    a permanent magnet disposed around said rotation output shaft for rotation therewith, said permanent magnetic having a polarity reverse to that of said rotating magnet field;
    a plurality of magnetic bodies integral with said permanent magnet radially outwardly in such a manner as to be rotatable with said permanent magnet and said rotation output shaft;
    each of said magnetic bodies having formed on an outer periphery thereof a magnetic tooth portion having an end portion, relative to a rotating direction, formed in a shape inclined at an acute angle, a width, in a circumferential direction, of said magnetic tooth portion of said each magnetic body being nearly equal to a width of said rotating magnetic field;
    a magnetic flux of said permanent magnet passing through said magnetic bodies, and each of said magnetic bodies having a wall thickness of a value such that, when said electromagnet is excited, said magnetic flux in said each magnetic body is converged on a side of said rotating magnetic field; and
    whereby, when said electromagnet is excited, said magnetic flux is rotated together with said rotating magnetic field, thereby imparting a rotating torque to said rotation output shaft.

11. A power generator according to claim 10, wherein each said magnetic body is connected at a radially inner portion thereof to said permanent magnet.

* * * * *